United States Patent
Sisk

(10) Patent No.: US 8,419,072 B2
(45) Date of Patent: Apr. 16, 2013

(54) SHALLOW ANGLE ELBOW

(75) Inventor: David E. Sisk, Bonne Terre, MO (US)

(73) Assignee: Bulk Tank, Inc., Park Hills, MO (US)

( * ) Notice: Subject to any disclaimer, the term of this patent is extended or adjusted under 35 U.S.C. 154(b) by 0 days.

(21) Appl. No.: 13/136,443

(22) Filed: Aug. 2, 2011

(65) Prior Publication Data
US 2012/0038148 A1 Feb. 16, 2012

Related U.S. Application Data

(60) Provisional application No. 61/401,599, filed on Aug. 16, 2010.

(51) Int. Cl.
*F16L 43/00* (2006.01)

(52) U.S. Cl.
USPC .............................. 285/179; 285/16; 406/195

(58) Field of Classification Search .................. 285/179, 285/179.1, 129.1, 16, 17; 406/193, 195
See application file for complete search history.

(56) References Cited

U.S. PATENT DOCUMENTS

| | | | | |
|---|---|---|---|---|
| 1,096,623 A * | 5/1914 | Girtanner | | 406/195 |
| 1,293,360 A * | 2/1919 | Daviess | | 285/16 |
| 4,387,914 A | 6/1983 | Paulson et al. | | |
| 4,521,038 A * | 6/1985 | Cerny | | 285/179 |
| 4,995,645 A * | 2/1991 | Pausch | | 285/179.1 |
| 5,060,984 A * | 10/1991 | Hess | | 285/179.1 |
| 5,288,111 A * | 2/1994 | Storf et al. | | 285/179 |
| 5,590,916 A * | 1/1997 | Liu | | 285/179.1 |
| 6,422,608 B1 * | 7/2002 | Lee et al. | | 285/179 |
| 6,443,671 B1 * | 9/2002 | Weiste | | 406/195 |
| 6,880,860 B2 * | 4/2005 | Gonzales et al. | | 285/179 |
| 6,951,354 B1 * | 10/2005 | Paulson | | 285/179 |
| 7,300,074 B1 * | 11/2007 | Paulson | | 285/179 |

* cited by examiner

*Primary Examiner* — David E Bochna
(74) *Attorney, Agent, or Firm* — Paul M. Denk

(57) ABSTRACT

An elbow has an elongated inlet, an elongated outlet tube that merges with the inlet at a shallow angle, and an endwall opposite the inlet. The round inlet receives product and leads to a first chamber with a rounded bottom. Opposite the bottom, the inlet has a pitch at the transition to the outlet tube. The outlet tube continues upwardly from the pitch to an exit. Within the outlet, a third chamber extends from the first chamber. The first chamber and the third chamber intersect at the second chamber that provides a transition to the flow of product from the first chamber to the angle of the third chamber. Within the second chamber, conveyed product forms a shallow eddy so that additional product flows over the eddy enroute to the outlet.

5 Claims, 3 Drawing Sheets

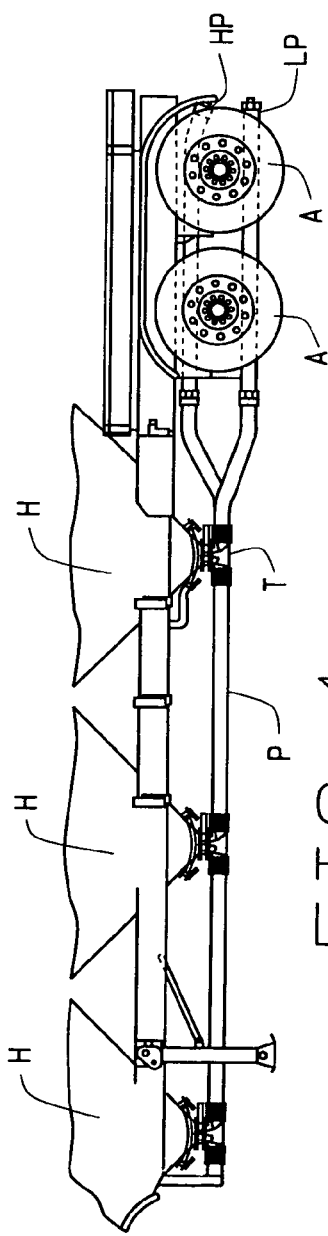
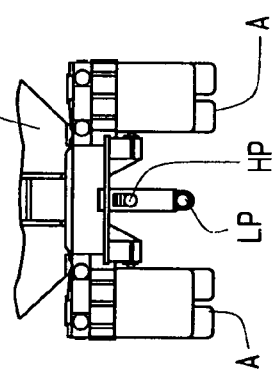
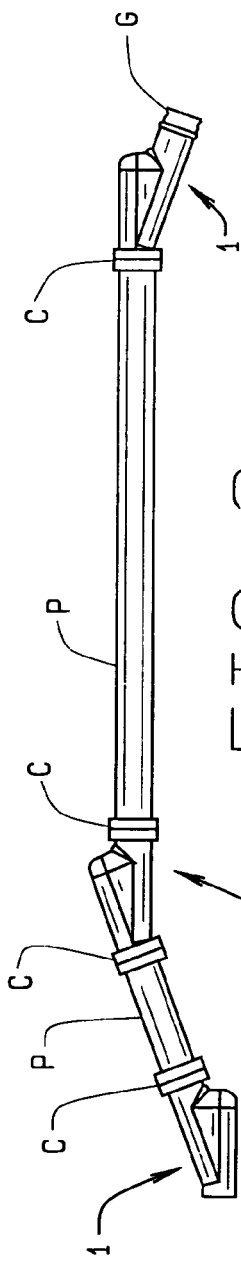
FIG. 1 PRIOR ART
FIG. 2 PRIOR ART
FIG. 3

SHALLOW ANGLE ELBOW

CROSS REFERENCE TO RELATED APPLICATION

This non-provisional patent application claims priority to the provisional patent application having Ser. No. 61/401,599, having filing date Aug. 16, 2010.

BACKGROUND OF THE INVENTION

This invention relates generally to pipe couplers, and more specifically, to an adjustable coupler with improved gasket and clips where the coupler joins pipes regardless of their end surface condition.

Clamps and couplers used to connect sections of pipe, end-to-end, have appeared in the pipe connecting art over the years. Such clamps often are is employed to connect sections of pipe or hopper tees on tank trailers and cars. In certain applications, particularly in dry bulk hauling, the integrity of the seal at the pipe connections is critical in preventing cross contamination of the products sequentially hauled in the tanker trailers. Often pellets, powders, and oil sands travel from a factory or a mine to a manufacturing plant in tank trailers. The pellets, powders, or sands unload through gravity gates, valves, or hoppers located on the bottom of the tank trailers. Hopper tees attached to the bottom of the hopper are connected to collection pipes. Pressurized air, or alternatively sometimes a vacuum, is employed through the pipes to accelerate the emptying of the dry bulk products.

The pressurized air enters a hopper from above and below through aerators then exits into the collection pipes. Pressurized air also enters the collection pipes from the upstream end, often proximate the tongue of a tank trailer. The pressurized air moves product along from a hopper through a tee and into the collection pipes for delivery. Dry bulk material, such as oil sands, though often moves in an irregular manner and may fluctuate in volume passed through collection pipe in a given time. The fluctuations in material flow and the air pressure in the collection pipe tend to separate adjacent pipe sections slightly, most of the time, and greatly, on rare occasions, leading to a disconnection or a rupture of the collection pipe.

Accounting for the slight separation in adjacent ends of pipes, fittings, such as couplers, include a gasket. The gasket fits snugly within an end of a fitting and around an end of a pipe. The gasket is generally a hollow cylinder with a thin wall that fits within an end of a fitting or an arm of a coupler. Gaskets can be formed as a single cylindrical piece or as a strip then bent into cylindrical form. During installation, a gasket inserts within a fitting's end or abuts a coupler arm subject to pinching when a pair of hinged arms closes. In allowing slight axial movement of pipe ends within a coupler, the gasket flexes along its wall, generally upon the inside surface of the gasket.

Generally, dry bulk product must empty completely between loads to is prevent contamination of later loads, a situation that trucking companies, mines, and manufacturing plants avoid at the highest of costs and efforts. For example, if the hauler carries black plastic resin beads, all of the black plastic resin must be removed from the tank trailer, as well as the hopper and piping often coupled together, to prevent contamination of a later load of white or other colored plastic resin. A hauler may also carry oil sands with a later load of flour further emphasizing the need to avoid contamination. Contamination, of even a small amount, can destroy a many ton load and force its disposal at high costs to the mine, the manufacturing plant, or the trucking firm.

DESCRIPTION OF THE PRIOR ART

Manufacturers and haulers have known that separation of adjacent pipes and fittings and contamination can occur at the point of coupling pipes together whether in a straight connection or at an angle. As shown in FIG. 1, a hauler trailer has three hoppers of an inverted cone like shape that empty to the bottom of the hopper. The hoppers empty through a valve into a hopper tee and then into a pressurized line. The line generally discharges towards the rear of the trailer, that is, towards the trailer wheels or away from the king pin. After the last hopper, the line requires realignment to pass the rear axles. The line may pass either below or above the rear axles and in doing so, the line has an angular adjustment proximate the last hopper tee. FIG. 2 shows how a realigned line may discharge bulk material either in a high position above the axles or a low position beneath the axles.

However, a line running beneath the axles with a low position discharge for product generally nears the surface, or road, upon which the hauler trailer travels. This low position makes the line beneath the axles highly vulnerable to road debris, raised center strips between tire tracks on an unimproved trail, and to railroad tracks at various levels of improvement. The low position also has vulnerability to hill crests where a descending tractor at a slightly lower elevation than the rear axles lowers the rear axles and items beneath them towards the traveling surface.

With recent heightened oil and gas exploration activity, more hauler trailers have entered unimproved road networks to move select sand—frac sand-forward to the exploration and then the production wells. To improve production from oil and gas wells, an oil company uses pressure to fracture the rock formations for improved flow of hydrocarbons to the wellbore. Upon removal of the pressure, the fractured rock heals itself and closes any passages therein, curtailing hydrocarbon flow immensely. As a remedy for this problem, an oil company pumps frac sand into a well during the fracturing operation. Because the drilling mud carries the sand into the fractured rock, the sand remains in the fracture upon removal of pressure, keeping the fracture open and the hydrocarbons flowing to the wellbore. The fractures usually extend vertically, which causes the sand to settle, keeping the bottom open, but allowing the top of the fracture to close. The drilling mud flows to and through a well and carries the sand during pumping, but then the mud changes to a gel when pumping stops, holding the sand in place until the fracture closes, trapping the sand between the rock layers. Then the gel decomposes and the drilling mud flows out of the well with hydrocarbons following behind it while the sand remains trapped in the rock, propping open the fractures.

Such frac sand comes from various places including Wisconsin and Missouri. Frac sand includes grains as round as minute snowballs and super strong, because the frac sand comprises almost pure quartz. The oil and natural gas exploration industry sees frac sand as perfect for its well drilling needs. Although high fuel prices may be painful at the gas pump, they also mean a boost in drilling for new oil and natural gas deposits. The frac sand mixes with water, and the oil company then pumps the slurry at very high pressure into oil and natural gas wells. The slurry of sand and water fractures the rock and then the strong, round sand grains hold open the fractures so the oil and natural gas return to the wellbore. The frac sand has grains completely round, similar to toy marbles and the grains do not compact or nest. The wider the sand grain, the more silica, and the greater its tensile strength. Such frac sand avoids crumbling and failing in a wellbore more than a mile into the earth.

With the frac sand found in the Midwest along river bluffs and the oil and natural gas exploration occurring in other states, various trucking companies transport the frac sand from the mines hundreds of miles to the wells. At a mine, various pieces of equipment mine, excavate, and collect the frac sands, then convey the frac sands for loading. The conveying equipment then deposits the frac sands into the hoppers of a hauler as pictured in FIG. 1. After reaching a well, the driver opens the hopper and unloads the frac sands through the line outwardly towards the rear axles, preferably over them, and into the oil company lines or equipment. After the last hopper tee, the line changes its angle, generally upward, for a short distance and then changes its angle again but in the opposite direction, downward, so that the line passes over the rear axles. Each change in direction calls for a fitting, more particularly an elbow, to realign the straight sections of pipe in the line. Though frac sand has been described, haulers also move silica for glass production, sand for concrete batches, and sand for other uses.

Various elbows have appeared in the prior art that transition flow of bulk materials, such as sand, at one angle to another angle. The U.S. Pat. No. 4,387,914 to Paulson, assigned to Hammertek, shows an elbow that transitions flow through ninety degrees. The elbow includes an arcuate chamber inwardly from the entry point where an eddy of product forms, preventing premature wear upon the lower portion of the elbow. The product entering the elbow passes over the eddy product instead of wearing the elbow directly.

The U.S. Pat. No. 5,060,984 of Hess and assigned to Hammertek shows another low wear elbow for a ninety degree flow transition. This elbow has a chamber outwardly and slightly below the entry port and a reinforcing strut between the chamber and the exit port.

Furthermore, the clamps and elbows of the prior art often have cast iron and mild steel parts that corrode from exposure to the environment as a tank trailer, or hopper trailer, travels the roads subject to rain, snow, and deicing compounds, among other things. Once corroded, the clamps and elbows become nearly impossible to remove from a pipe. If changing the direction of the line beneath a hauler, the driver must pry an elbow from the line with a pry bar or a length of pipe. In some situations, the driver must hammer the elbow carefully to free it from the pipe.

Finally, such clamps and elbows with their flanges have less versatility because they do not easily connect different pipe sections together. For example, the elbows have flanges that connect to other flanged fittings but not to round pipe directly. An elbow may have to connect two sections of smooth pipe, connect two sections of grooved pipe, or connect a smooth pipe to a grooved pipe. Prior art elbows may work to connect pipes of matching surface condition, but do not accommodate different styles of pipe.

As the frac sand resists compression from geologic rock forces, the frac sand can rapidly wear pipe and fittings that convey it. Where a moving material changes direction of flow, forces accumulate and abradingly wear down a location upon a pipe or fitting. In time, the fitting has a hole worn into it that leaks product from the fitting or the fitting fails dumping product. The present invention though seeks to avoid those adverse events during frac sand unloading. A to unique aspect of the shallow angle elbow includes an elongated bottom, a triangular shaped eddy chamber, and a recurved transition for outward flow from the elbow.

SUMMARY OF THE INVENTION

A shallow angle elbow has an elongated inlet, an elongated outlet that merges with the inlet at a shallow angle to the length of the elbow, and an endwall closing the inlet below the outlet. The inlet has a round opening that receives product from upstream. Inside, the opening leads to a first chamber, within the inlet, that has a rounded bottom extending for its length to the endwall. Opposite the bottom, the inlet has a pitch partially away from the opening, where the pitch indicates the beginning of the transition to the outlet. The outlet continues upwardly and away from the pitch for its length to an exit. Within the outlet, a third chamber extends at an angle away from the first chamber. The first chamber and the second chamber generally have hollow cylindrical shapes of similar diameter. The first chamber and the third chamber intersect at the second chamber having an inclined partial conic shape. The second chamber provides a transition to the flow of product from the first chamber to the angle of the third chamber. The second chamber has its base proximate the outlet and formed of an endwall and a recurve that merges the endwall into the outlet. Within the second chamber, conveyed product forms a shallow eddy so that additional product flows over the eddy enroute to the third chamber and eventual exit from the outlet. In an alternate embodiment, the endwall, the recurve, and the bottom have additional thickness of material to increase wear resistance.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a shallow angle elbow that adjusts the angle of one pipe relative to an adjacent pipe for passage over the axles of a trailer.

Another object of the present invention is to provide a shallow angle elbow that seals the joints of abutting pipes.

Another object of the invention is to provide a shallow angle elbow that connects pipes of the same outer diameter with any end surface condition.

Still another object of the present invention is to provide a shallow angle elbow that resists separation from adjacent pipes during fluctuations in pressure within the elbow.

Still another object of the present invention is to provide such a shallow angle elbow made from long lasting corrosion-resistant material.

Yet another object of the present invention is to provide a shallow angle elbow that requires no tools to install or to remove.

Still another object of the present invention is to provide such a shallow angle that is durable, long lasting, economical to manufacture.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In referring to the drawings,

FIG. 1 shows a side view of a trailer with alternate line paths proximate the rear axles;

FIG. 2 shows an end view of a trailer with the openings of the alternate line paths;

FIG. 3 shows a side view of the present invention connected to various lengths of pipe to span above rear axles of a trailer;

The same reference numerals refer to the same parts throughout the various figures.

DESCRIPTION OF THE PREFERRED EMBODIMENT

The present invention overcomes the prior art limitations by providing a shallow angle elbow that fits upon two pipes in an end to end connection at an angle to span over the rear axles of a tank or hopper trailer.

As described above, FIG. 1 shows the situation of a tank or hopper trailer that unloads hoppers below and conveys bulk product by lines to the rear of the trailer. The lines then must pass the rear axles for unloading beyond the wheels of the trailer to the rear. A line below the rear axles risks damage from road hazards while a line above the rear axles avoids those risks. FIG. 2 shows a rear view of a trailer where the lines have a low position, LP, that risks damage and a high position, HP, which avoids such damage.

Then FIG. 3 has a plurality of the present invention 1 deployed in connection with a line of pipes P that rises upwardly at an angle, then levels to span over the rear axles of a trailer. After the axles, to the right of the figure, one of the invention turns downwardly and has a cap or gasket G upon the opening of the invention away from the rear of the trailer.

Figure 4:
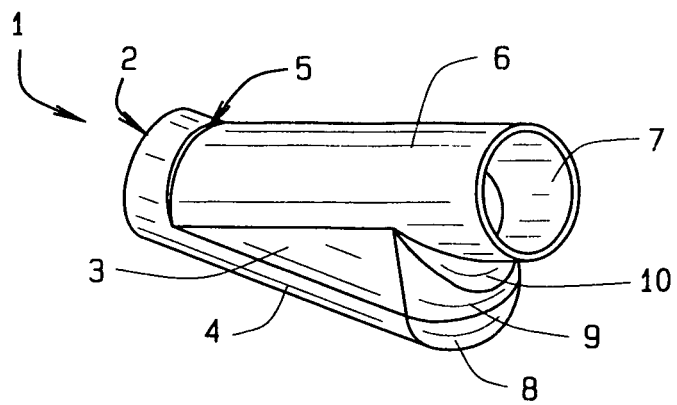
FIG. 4 illustrates a perspective view of the rear of the present invention.

FIG. 4 provides a perspective view of the invention that has an inlet 2, generally round of the same diameter as the typical line pipe, that is, 4 inch or 5 inch. The inlet extends rearwardly to a sidewall 3 here shown as somewhat triangular at an approximate angle of twenty degrees. The inlet also extends to a bottom 4 generally beneath the sidewall and defining the length of the invention. The bottom has a generally semicircular cross section as later shown in FIGS. 7, 8. Above the bottom and slightly inwardly from the inlet, the invention has a pitch 5 where the invention attains an upward angle of an outlet tube 6. The outlet tube has a generally hollow, round cross section for passage of bulk product at an angle to the inlet. The outlet tube delivers bulk product through its outlet 7 generally opposite the inlet though at a higher elevation from the inlet as shown. The outlet also has similar diameter to the pipe, 4 inch or 5 inch.

The inlet 2 has a generally longitudinal axis as to be noted at a1. The outlet tube 6 has a longitudinal axis generally as noted at a3. The relative angular relationship between the axis a1, and the axis a3, is normally within the range of approximately 20°. Although, it is obvious that other angular relationships may be made for the relative displacement between the inlet tube 2, and the outlet tube 6. Between the inlet tube 2, and the outlet tube 6, there is formed an intermediate or second chamber 12 that merges between the outlet tube or chamber 6, and the inlet tube or chamber 2. That intermediate chamber also has a substantially longitudinal axis, as noted at a2, and the axis of this intermediate chamber is also arranged upon an incline at an angle displaced from the axis a1, of the inlet chamber 2, but less than the longitudinal axis a3 of the outlet chamber 6, as to be noted. Nevertheless, the size and capacity of this second chamber 12 will depend upon the structured angle of inclination of the outlet chamber 6, relative to the longitudinal axis a1 of the inlet chamber 2. This intermediate chamber provides the enhanced benefits and results in the flowability of material through the elbow 1, as fully explained in the description of the invention herein, and as summarized.

Obviously, the angles of inclination between the first tubular inlet tube or chamber, and the third chamber forming the outlet can vary to whatever angle is desired for the structural relationship of the various piping that is formed into the structure of the pipe conveying system, depending upon how close to the vehicle axle the elbows are to be placed, or how far away they may locate, depending upon the clearance provided to the underside of the axle system for the vehicle involved. These angles could be as much as 30°, or more, or even shallower then 20° in angular relationship. These will dictate the angular relationship between the structured inlet and outlet for the elbow, and the intermediate or second chamber provided therein, as noted.

Beneath the outlet and opposite the inlet, the bottom joins with a partially spherical end 8. The end 8 follows the curvature of the bottom but also extends the curvature at the same radius rearwardly from the sidewall. Above the end 8, an endwall 9 extends further upwardly. The endwall 9 curves rearwardly at the same radius as the end 8. The endwall though also curves upwardly to the uppermost connection of the sidewall to the outlet tube 6, as at 3a. Beneath that connection, the endwall has a flush joint with the sidewall. Above the endwall 9 and beneath the outlet tube, a recurve 10 fits between the endwall and the lower portion of the outlet tube. The recurve follows the radius of the endwall outwardly and the profile of the endwall upwardly to the outlet tube as at 3a. The recurve though also has its own internal radius, later shown in FIGS. 5, 6. The internal radius is generally opposite that of the end. The end 8, endwall 9, and recurve 10 cooperate with the bottom, sidewall, and outlet tube so that product flows smoothly through the inlet 2, attains an upwardly angle, and then exits through the outlet 7.

Figure 5:
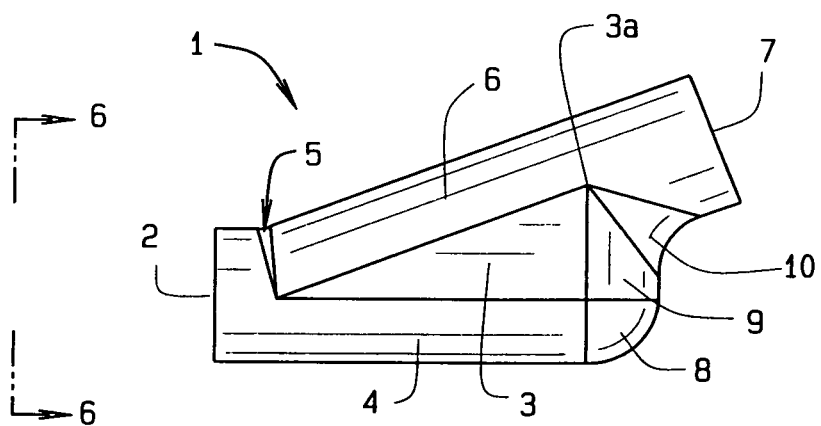
FIG. 5 describes a side view of the present invention.

FIG. 5 then shows the invention from one side. The invention is generally symmetric in a side view so this description applies to both sides. The inlet 2 admits product into the elbow 1. The inlet is a generally round, hollow cylinder, that joins to the bottom 4. The bottom has the same radius and outer diameter as the inlet but extends rearwardly from the inlet for the majority of the length of the elbow. Opposite the bottom and behind the inlet, the pitch 5 transitions the surface of the inlet upwardly to the angle of the outlet tube 6. The pitch has its widest portion generally opposite the bottom and then it narrows towards the bottom, proximate the mid point of the depth of the inlet. The outlet tube then proceeds upwardly from the pitch upon an approximate twenty degree angle. The outlet tube also has a round, hollow cylindrical shape then opens to the outlet 7, opposite the inlet, generally to the right of the figure.

The outlet tube though has its geometry intersected by the sidewall 3, here shown in a triangular shape. The sidewall forms a plane generally tangent to the bottom 4 and the outlet tube 6. Where the pitch 5 narrows at the midpoint of the inlet depth, the sidewall begins at its narrowest height. Rearwardly the sidewall 3 expands in height from a constant base where the sidewall joins the bottom. The sidewall has its maximum height proximate the end, as at 3a. The sidewall though does reduce the exterior cylindrical appearance of the outlet tube along the length of the sidewall. Opposite the inlet, the end 8 joins to the bottom 4 with a partially spherical form, here shown as a quarter circle. The endwall 9 extends upwardly from the end, following the radius of the end, but tapering upwardly towards the top of the sidewall, as at 3a. From the side, the endwall has a somewhat triangular shape. The outlet tube still has its outlet 7 and the recurve 10 spans between the endwall and the outlet. The recurve extends from the top of the sidewall outwardly and widening to fill the gap between the endwall and the outlet. The recurve though gently transitions the endwall from the outward radius of the end to its inward radius. The recurve has a somewhat concave shape with a radius generally opposite that of the end. The recurve and the end combine into a somewhat S like shape here shown in the side view.

Figure 6:
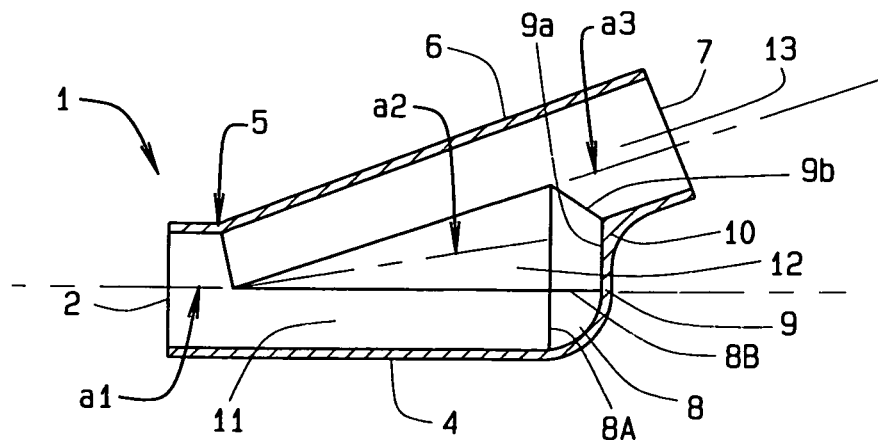
FIG. 6 provides a sectional view of the present invention.

Inside the elbow 1, FIG. 6 shows a lengthwise, sectional view generally interior of FIG. 5. The inlet admits product into the elbow and upon the bottom 4 that extends lengthwise to the end 8. The end curves along a vertical radius, as at 8a, and along a horizontal radius, as at 8b. Curving along two axes provides the partial spherical form of the end. Upon the horizontal radius 8b, the endwall 9 joins to the end 8. The endwall extends upwardly, that is, away from the bottom, into the outlet tube as along riser line 9a. The endwall has a similar radius of curvature as at 8b but stretched upwardly to merge with the outlet tube. The endwall follows the radius of the outlet tube along a belt line as at 9b. The belt line spans from the recurve inwardly to the maximum height of the sidewall. The belt line generally has a slight angle to the radius of the outlet tube.

Contained within the bottom and the end, a first chamber 11 receives product admitted through the inlet 2. The first chamber has a generally half cylindrical shape rounded in proximity to the end 8. The outlet tube 6 contains a third chamber 13 that generally follows the outlet tube as it extends back to the pitch 5. The third chamber has a generally cylindrical shape, except for a removed chordal space where the first chamber intersects with the third chamber at a second chamber 12. The second chamber remains with the sidewalls 3 of both sides and extends to the endwall 9 and into the recurve 10. The second chamber has a generally wedge like shape with the point of the shape locating towards the inlet. The second chamber 12 begins at approximately the midpoint of the depth of the inlet and extends away from the bottom upwardly towards the third chamber. The second chamber extends rearwardly in a somewhat rounded form to the endwall and into the recurve. The second chamber merges with the third chamber along belt line 9b and merges with the endwall along horizontal radius 8b.

Product enters the inlet, and then proceeds to the first chamber 11. The initial loading of product occupies the first chamber back to the end 8. As flow continues, additional product proceeds into the second chamber 12 and accumulates against the endwall and recurve. At full product flow, the product passes from the second chamber into the third chamber 13 and then exits the outlet 7. Freely flowing product then enters the inlet and passes over other product in the second chamber on its way to the outlet. The second chamber accommodates an eddy of flowing product proximate the end and the endwall. The eddy turns in a generally clockwise direction along the interior surfaces of the end and endwall. The end and the endwall have additional thickness of material to resist the abrasion imparted by the frac sand and other products against them. Further, the belt line 9b, though shown as a line, also has additional thickness of material to resist the abrasion of product transiting from the second chamber into the third chamber.

Figure 7:
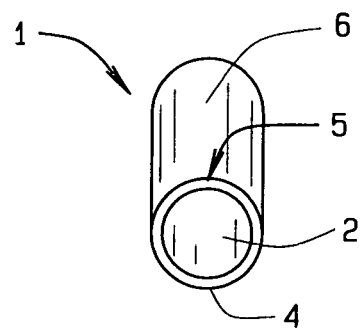
FIG. 7 illustrates an end view of the inlet of the present invention.

Having described the interior of the elbow and product flow through it, FIG. 7 shows a front view of the elbow ready to receive product. The elbow 1 has its inlet 2, generally round of a diameter compatible with pipes of trailer vacuum and pneumatic conveying systems, often 4 or 5 inch. The inlet is hollow and leads to the interior of the elbow. Beneath the inlet, the elbow has its bottom 4 here shown as semi-circular. Opposite the bottom, the inlet continues rearwardly for a short distance to the pitch 5 where the outlet tube 6 extends upwardly from the inlet and the bottom. The outlet tube is also hollow and generally of the same radius as the bottom. The outlet tube generally ascends from the inlet at approximately twenty degrees, more or less. In this view, the elbow transitions the flow of product upwardly.

Figure 8:
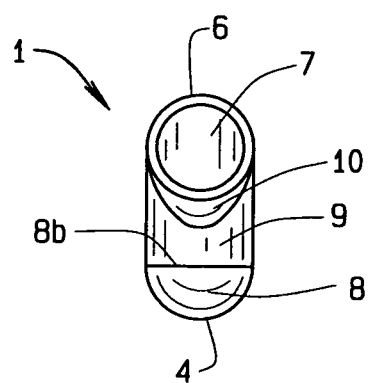
FIG. 8 also illustrates an end view of the outlet of the present invention, opposite that of FIG. 7.

Opposite FIG. 7, FIG. 8 shows a rear view of the elbow ready to discharge product through the outlet 7. The outlet 7 is generally round with the same radius as the bottom as previously shown. The hollow outlet allows product to exit from the outlet tube 6. The outlet tube extends forward and downward from the outlet towards the remainder of the elbow 1. Slightly forward from the outlet, the outlet tube 6 joins to the recurve 10. The recurve guides a portion of the outlet tube to turn downwardly and merge with the endwall 9 extending from the sidewalls, not shown. The endwall then merges with the end 8 beneath it that leads to the bottom and then the inlet. The outlet also has a diameter compatible with pipes of trailer vacuum and pneumatic conveying systems. In an alternate embodiment, both the outlet and the inlet may receive couplers. In an alternate embodiment, both the outlet and the inlet may have grooves upon their circumference in cooperation with specific couplers.

It will be appreciated by those skilled in the art that various changes and modifications can be made in the shallow angle elbow without departing from the scope of the appended claims. Furthermore, the various elbows are shown capable of connecting sections of pipe. The elbows can also be used to connect sections of pipe to hopper tees or other fittings. The elbows accommodate both grooved and smooth ends of pipe.

From the aforementioned description, a shallow angle elbow has been described. The shallow angle elbow is uniquely capable of adjusting the flow of product so that pipes can pass over the rear axles of hopper or tank trailers thus preventing damage to pipes positioned near a road surface. Though some materials have been identified for the elbow, the shallow angle elbow of the present invention contemplates using materials and various components that may be manufactured from many materials including but not limited to polymers, high density polyethylene HDPE, polypropylene PP, polyvinyl chloride PVC, nylon, steel, cast iron, ferrous and non-ferrous metals, their alloys and composites.

The phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. A shallow angle elbow for effecting shallow angular adjustments in product flow there through without excessive wear upon said elbow, comprising:
   an inlet;
   an outlet opposite said inlet;
   an outlet tube extending inwardly from said outlet towards said inlet, said outlet tube attaining a shallow angle relative to said inlet;
   a first chamber extending inwardly from said inlet, said first chamber having a generally cylindrical shape;
   a third chamber extending inwardly from said outlet, said third chamber having a generally cylindrical shape;
   a second chamber forming from the merging of said first chamber with said third chamber inwardly from said inlet, said second chamber having a partially conical shape;
   a bottom, generally hollow, extending rearwardly from said inlet;
   an end, generally partially spherical joining to said bottom opposite said inlet;
   said first chamber forming within said bottom;
   an endwall joining above said end;
   a recurve joining above said endwall;
   two mutually parallel and spaced apart sidewalls, generally triangular in shape, extending along said outlet tube and said bottom, widening away from said inlet;
   said second chamber forming within said endwall, said recurve, and said sidewalls, wherein said end, said endwall, and said recurve have similar radii; and
   wherein said elbow conveys product through said first chamber, then said second chamber, and into said third chamber for eventual discharge out of its outlet.

2. The shallow angle elbow of claim 1 wherein said end curves opposite that of said recurve.

3. The shallow angle elbow of claim 1 wherein said outlet tube attains an angle of approximately twenty degrees relative to said inlet.

4. The shallow angle elbow of claim 1 wherein the angular displacement of the third chamber relative to the first chamber is at a fixed angle, and the angular displacement of the second chamber is at an elevated angle from the longitudinal access of the first chamber, but less than the angular displacement formed between the third chamber and the first chamber in the structured elbow.

5. The shallow angle elbow of claim 1 wherein said elbow is used in the conveyance of material from a tank trailer, said tank trailer incorporating at least one axle, and said shallow angle elbow adjusts the angle of flow of the granular material over the axle of a tank trailer.

* * * * *